United States Patent
Cunning

(10) Patent No.: US 11,962,271 B1
(45) Date of Patent: Apr. 16, 2024

(54) SOLAR USB CHARGER

(71) Applicant: Dalia Cunning, Stratford, CT (US)

(72) Inventor: Dalia Cunning, Stratford, CT (US)

( * ) Notice: Subject to any disclaimer, the term of this patent is extended or adjusted under 35 U.S.C. 154(b) by 451 days.

(21) Appl. No.: 17/409,870

(22) Filed: Aug. 24, 2021

(51) Int. Cl.
| | |
|---|---|
| *H02S 30/20* | (2014.01) |
| *H01M 10/44* | (2006.01) |
| *H02J 7/00* | (2006.01) |
| *H02J 7/35* | (2006.01) |
| *H02S 40/36* | (2014.01) |
| *H02S 40/38* | (2014.01) |

(52) U.S. Cl.
CPC ............. *H02S 30/20* (2014.12); *H01M 10/44* (2013.01); *H02J 7/0045* (2013.01); *H02J 7/35* (2013.01); *H02S 40/36* (2014.12); *H02S 40/38* (2014.12); *H01M 2220/30* (2013.01)

(58) Field of Classification Search
CPC ...................................................... H02S 30/20
USPC ......................................................... 320/101
See application file for complete search history.

(56) References Cited

U.S. PATENT DOCUMENTS

| | | | | |
|---|---|---|---|---|
| 5,522,943 | A * | 6/1996 | Spencer | ................. H01L 31/042 |
| | | | | D13/102 |
| 7,679,312 | B2 | 3/2010 | Toya et al. | |
| 7,893,657 | B2 | 2/2011 | Chavakula | |
| 8,111,034 | B2 | 2/2012 | Fowler | |
| 8,319,470 | B2 | 11/2012 | English | |
| D708,570 | S | 7/2014 | Martin | |
| 9,865,903 | B1 * | 1/2018 | Petrella | ...................... H02J 7/35 |
| 10,608,579 | B1 * | 3/2020 | Guzman | ................. H02J 7/342 |
| 2010/0156339 | A1 * | 6/2010 | Hoffman | ................. H02S 10/40 |
| | | | | 320/101 |
| 2011/0273133 | A1 * | 11/2011 | Sala | ..................... H01M 10/465 |
| | | | | 320/101 |
| 2012/0090659 | A1 * | 4/2012 | Muchow | ................. H02S 30/20 |
| | | | | 136/245 |
| 2013/0285593 | A1 | 10/2013 | Chu | |
| 2015/0102762 | A1 * | 4/2015 | Goei | ......................... H02J 7/35 |
| | | | | 320/101 |
| 2018/0294534 | A1 * | 10/2018 | Sala | ..................... H01M 10/465 |
| 2019/0045898 | A1 * | 2/2019 | Cai | ......................... A45C 5/03 |
| 2021/0376652 | A1 * | 12/2021 | Luangrath | ................. H02J 7/35 |
| 2022/0158584 | A1 * | 5/2022 | Miller | ..................... H02S 10/40 |

FOREIGN PATENT DOCUMENTS

| | | |
|---|---|---|
| WO | 2011100262 A1 | 8/2011 |
| WO | WO-2018160761 A1 * | 9/2018 |

* cited by examiner

*Primary Examiner* — Jerry D Robbins
(74) *Attorney, Agent, or Firm* — Kyle A. Fletcher, Esq.

(57) ABSTRACT

The solar USB charger comprises a first solar panel, a second solar panel, a spine, a controller, and a pocket. The first solar panel and the second solar panel may be adapted to convert incident light from a light source into an electrical potential. As a non-limiting example, the light source may be the sun. The electrical potentials from the first solar panel and the second solar panel may be electrically coupled to the controller where the electrical potential may be operable to recharge a battery, to power one or more USB charging ports, to illuminate a plurality of LEDs, or combinations thereof. The first solar panel and the second solar panel may be hingedly coupled via the spine. The plurality of LEDs may be operable to provide illumination.

18 Claims, 5 Drawing Sheets

SOLAR USB CHARGER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of solar charging systems and solar illumination systems, more specifically, a solar USB charger.

SUMMARY OF INVENTION

The solar USB charger comprises a first solar panel, a second solar panel, a spine, a controller, and a pocket. The first solar panel and the second solar panel may be adapted to convert incident light from a light source into an electrical potential. As a non-limiting example, the light source may be the sun. The electrical potentials from the first solar panel and the second solar panel may be electrically coupled to the controller where the electrical potential may be operable to recharge a battery, to power one or more USB charging ports, to illuminate a plurality of LEDs, or combinations thereof. The first solar panel and the second solar panel may be hingedly coupled via the spine. The plurality of LEDs may be operable to provide illumination.

An object of the invention is to convert light from a light source into an electrical potential for use in recharging one or more rechargeable devices connected via a USB charging port.

Another object of the invention is to recharge a battery from the solar panels such that the battery may recharge the rechargeable devices in the absence of a light source.

A further object of the invention is to provide a plurality of LEDs that may be operable as a source of illumination and may be powered from the battery.

Yet another object of the invention is to couple the solar panels to backing boards that are hingedly coupled via a spine such that the solar panels may be moved to at least a flat configuration, a tent configuration, and a book configuration.

These together with additional objects, features and advantages of the solar USB charger will be readily apparent to those of ordinary skill in the art upon reading the following detailed description of the presently preferred, but nonetheless illustrative, embodiments when taken in conjunction with the accompanying drawings.

In this respect, before explaining the current embodiments of the solar USB charger in detail, it is to be understood that the solar USB charger is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the solar USB charger.

It is therefore important that the claims be regarded as including such equivalent construction insofar as they do not depart from the spirit and scope of the solar USB charger. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
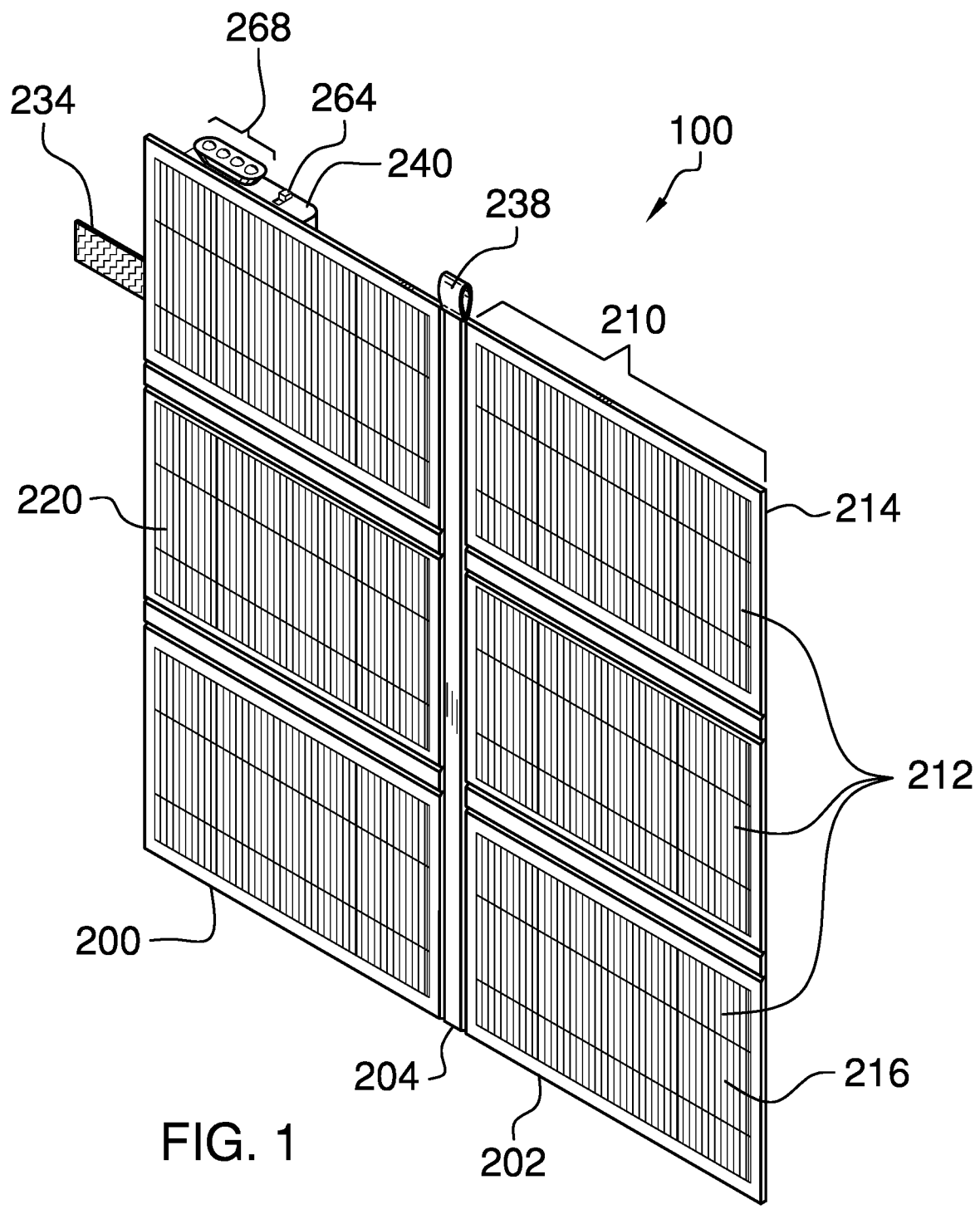
FIG. 1 is a front isometric view of an embodiment of the disclosure.
Figure 2:
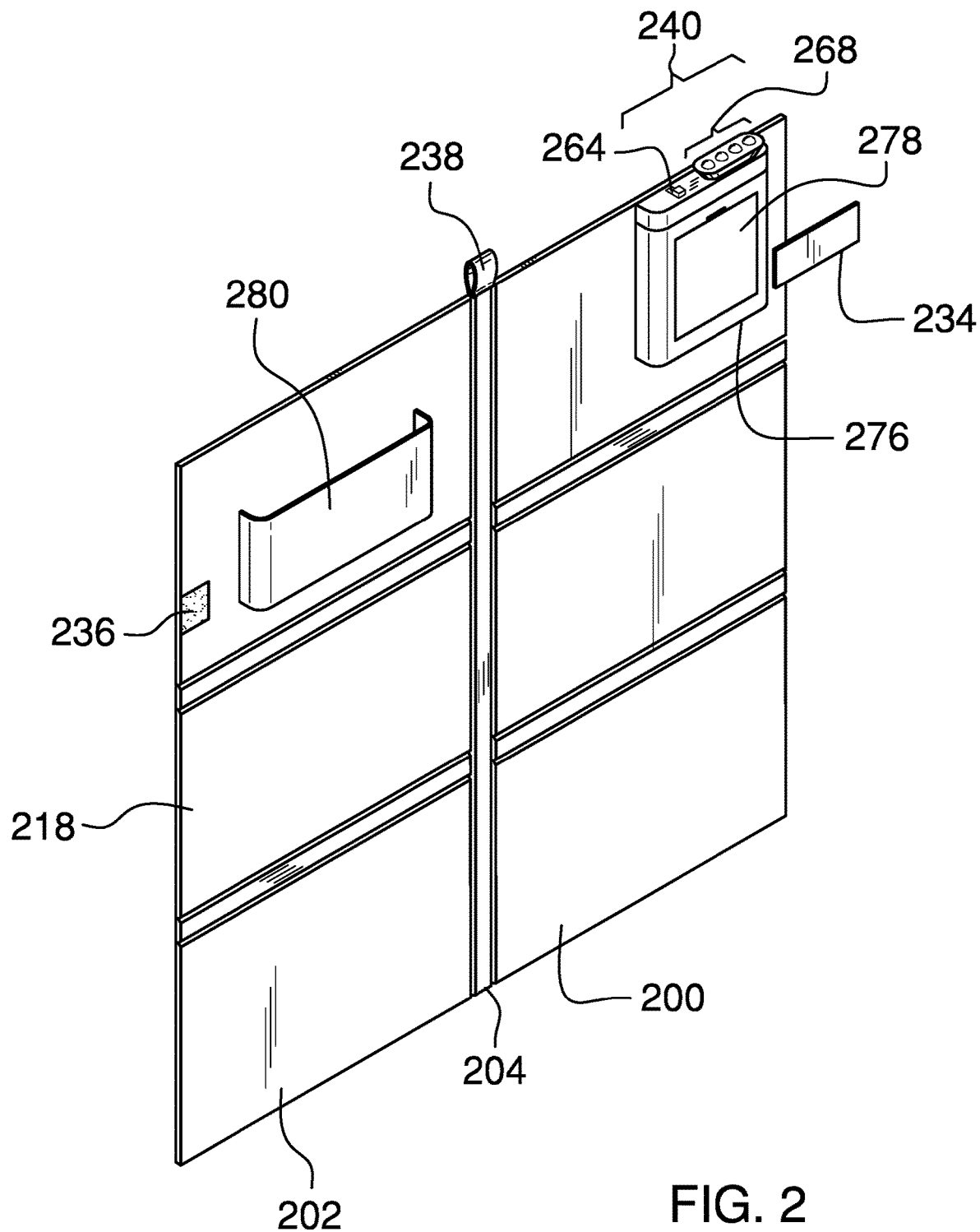
FIG. 2 is a rear isometric view of an embodiment of the disclosure.
Figure 3:
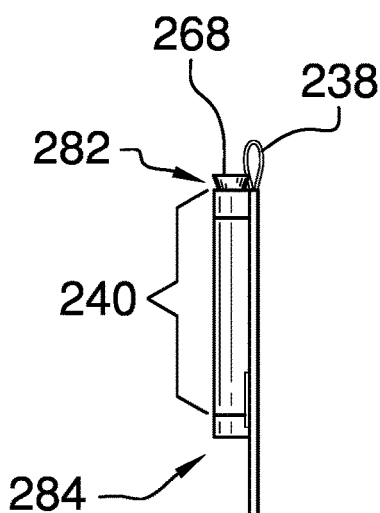
FIG. 3 is a side view of an embodiment of the disclosure.
Figure 4:
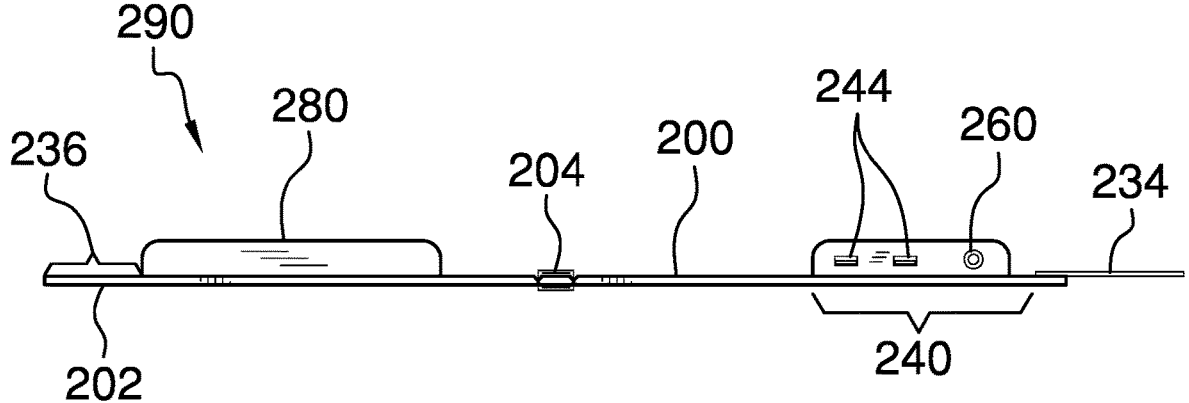
FIG. 4 is a bottom view of an embodiment of the disclosure when the invention is unfolded to a flat configuration.
Figure 5:
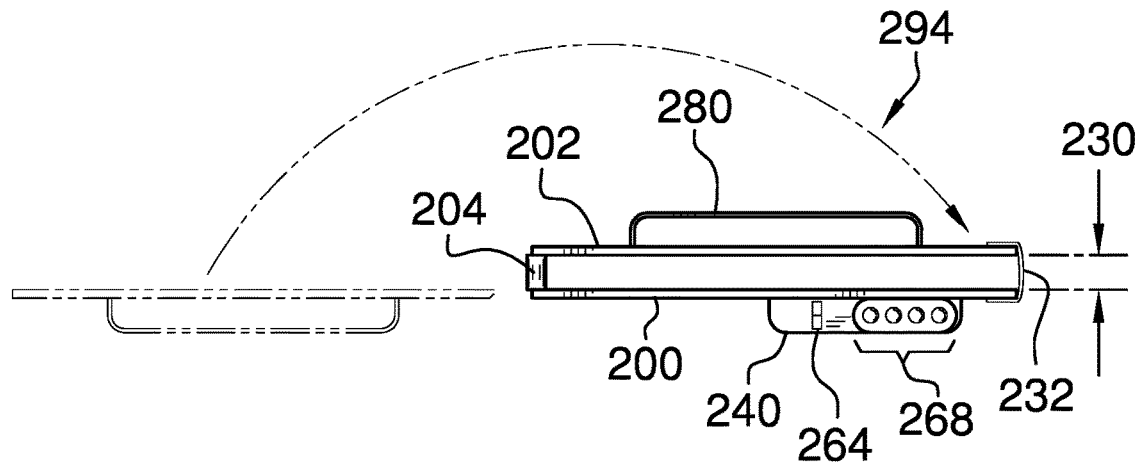
FIG. 5 is a top view of an embodiment of the disclosure when the invention is folded to a book configuration.
Figure 6:
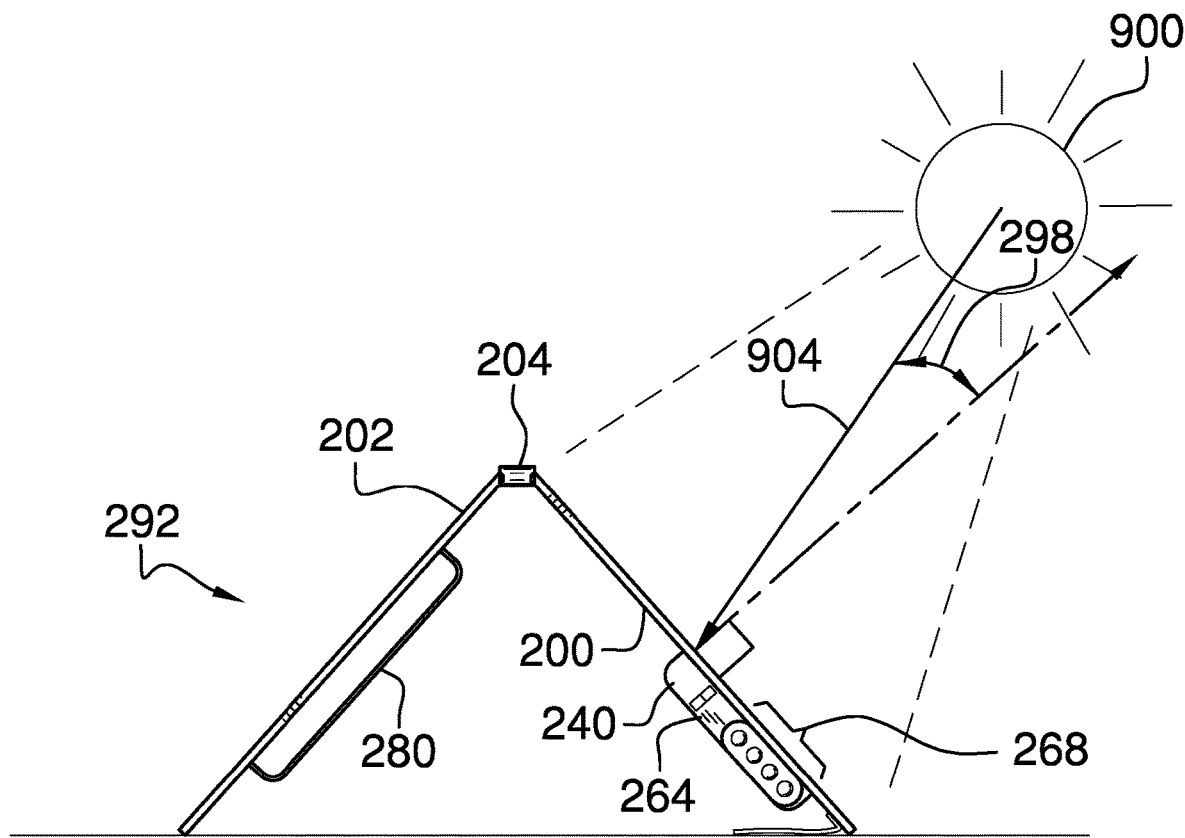
FIG. 6 is an in-use view of an embodiment of the disclosure when the invention is folded to a tent configuration.
Figure 7:
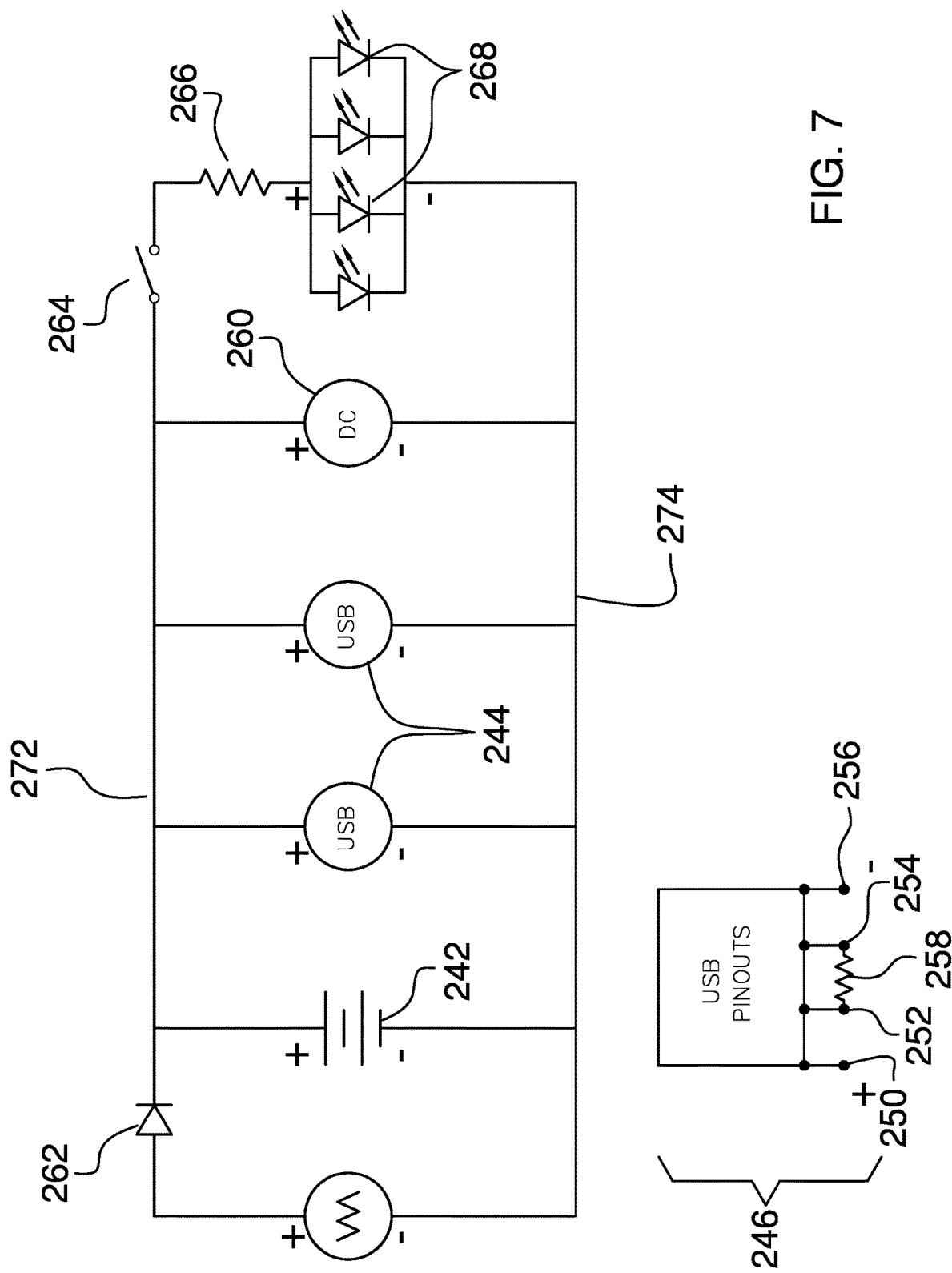
FIG. 7 is a schematic diagram of circuitry in a controller according to an embodiment of the disclosure.

Detailed reference will now be made to a first potential embodiment of the disclosure, which is illustrated in FIGS. 1 through 7.

The solar USB charger 100 (hereinafter invention) comprises a first solar panel 200, a second solar panel 202, a spine 204, a controller 240, and a pocket 280. The first solar panel 200 and the second solar panel 202 may be adapted to convert incident light 904 from a light source 900 into an electrical potential. As a non-limiting example, the light source 900 may be the sun. The electrical potentials from the first solar panel 200 and the second solar panel 202 may be electrically coupled to the controller 240 where the electrical potential may be operable to recharge a battery 242, to power one or more USB charging ports 244, to illuminate a plurality of LEDs 268, or combinations thereof. The first solar panel 200 and the second solar panel 202 may be hingedly coupled via the spine 204. The plurality of LEDs 268 may be operable to provide illumination.

An individual solar panel 210 selected from the first solar panel 200 and the second solar panel 202 may comprise one or more solar cells 212 coupled to one side of a backing panel 214. The side of the backing panel 214 where the one or more solar cells 212 are coupled may define an obverse side 216 of the individual solar panel 210. The side of the backing panel 214 that is opposite the obverse side 216 may define a reverse side 218 of the individual solar panel 210.

The first solar panel 200 and the second solar panel 202 may collectively be referred to as solar panels. The solar panels may be operable to unfold to a flat configuration 290 where both of the solar panels have equal exposure to the light source 900. Alternatively, the solar panels may be operable to fold to a tent configuration 292 where the solar panels are angled with respect to the supporting surface such that a solar incidence angle 298 between the light source 900 and one of the solar panels may be minimized. The one or more solar cells 212 may produce a maximum energy output when the light source 900 is directly perpendicular to the one or more solar cells 212. The solar panels may be operable to fold to a book configuration 294 such that the first solar panel 200 and the second solar panel 202 may be substantially parallel to each other and may be located inside of the book configuration 294 where the solar panels are not exposed. The book configuration 294 may reduce the likelihood of physical damage to the solar panels. The spine 204 may define a separation distance 230 between the solar panels such that when the solar panels are folded to the book configuration 294 the separation distance 230 may provide clearance between the solar panels for the controller 240 and the pocket 280.

An individual solar cell 220 selected from the one or more solar cells 212 may be a photovoltaic solar cell that develops the electrical potential between surfaces of the individual solar cell 220 when exposed to the light source 900. In general, the output voltage of the individual solar cell 220 is constant when no load is connected regardless of how the intensity of the incident light 904 striking the surface of the individual solar cell 220 varies and the current output of the individual solar cell 220 is proportional to the intensity of the incident light 904. The individual solar cells 220 or groups of the individual solar cells 220 may be wired in series to increase the voltage output. The individual solar cells 220 or groups of the individual solar cells 220 may be wired in parallel to deliver more current. The voltage output of the individual solar cell 220 under load may be lower than the open-circuit voltage output. In a preferred embodiment, the first solar panel 200 and the second solar panel 202 may be wired in parallel to provide 6.0 volts+/−0.5 volts to the controller 240 when under load. The solar panels may be electrically coupled in parallel with each other and with the controller 240 via wiring that runs through the backing panels 214 and through the spine 204.

A nylon fastener 232 may retain the first solar panel 200 to the second solar panel 202 in the book configuration 294. The nylon fastener 232 may comprise a first fastener segment 234 and a second fastener segment 236. The first fastener segment 234 may be coupled to the edge of the first solar panel 200 that is opposite the spine 204. The second fastener segment 236 may be coupled to the edge of the second solar panel 202 that is opposite the spine 204. The first fastener segment 234 may detachably couple to the second fastener segment 236 to hold the first solar panel 200 in an orientation that is substantially parallel to the second solar panel 202 when the solar panels are folded to the book configuration 294. The spine 204 may comprise a loop 238 that may be operable for hanging the invention 100 and/or may make the invention 100 easier to carry.

The controller 240 may comprise the battery 242, the one or more USB charging ports 244, a blocking diode 262, the plurality of LEDs 268, a switch 264, and a dropping resistor 266. The controller 240 may electrically couple the solar panels, the battery 242, the one or more USB charging ports 244, the blocking diode 262, the switch 264, the dropping resistor 266, and the plurality of LEDs 268 via a circuit board enclosed in a housing 276. The controller 240 may be coupled to the reverse side 218 of the first solar panel 200.

The battery 242 may comprise one or more energy-storage devices. The battery 242 may be a source of electrical energy to operate the one or more USB charging ports 244 and/or the plurality of LEDs 268. The battery 242 may be rechargeable and replaceable. In a preferred embodiment, the output voltage of the battery 242 may be 5.0 volts+/−5%. The battery 242 may be accessed for removal and replacement via a battery door 278 on the housing 276.

The one or more USB charging ports 244 may be USB connectors where rechargeable devices may be detachably coupled via USB cables such that the rechargeable devices may be recharged. The electrical potential used to recharge the rechargeable devices via the one or more USB charging ports 244 may be sourced from the solar panels, from the battery 242, from a DC power port 260, or combinations thereof.

An individual USB charging port 246 selected from the one or more USB charging ports 244 may be a USB connector with a VCC pin 250 electrically coupled to a positive side 272 of the battery 242 and a GROUND pin 256 electrically coupled to a negative side 274 of the battery 242. As a non-limiting example, the individual USB charging port 246 may be a USB A connector. The individual USB charging port 246 may have a D+ pin 254 electrically coupled to a D− pin 252 via a shorting resistor 258 to signal to the rechargeable device that the rechargeable device is coupled to a charger and therefore a charging current greater than 100 mA is available. In a preferred embodiment, the shorting resistor 258 may have a value of 200 ohms.

The positive side 272 of the solar panels may be coupled to the positive side 272 of the battery 242 via the blocking diode 262 to permit charging of the battery 242 from the solar panels and to prevent the battery 242 from discharging through the solar panels when the intensity of the light source 900 is low. A voltage drop across the blocking diode 262 may reduce the electrical potential available to the battery 242 from the solar panels from 6.0 volts to a value closer to 5.0 volts. In general, the electrical potential applied to the battery 242 must be larger than the battery voltage in order to charge the battery 242.

The plurality of LEDs 268 may illuminate when energized. The plurality of LEDs 268 may be energized by moving the switch 264 to an ON position and may be de-energized by moving the switch 264 to an OFF position. The dropping resistor 266 may reduce the current flow through the plurality of LEDs 268. The plurality of LEDs 268 and the switch 264 may be positioned on a first end 282 of the controller 240 such that the plurality of LEDs 268 are adjacent an edge of the first solar panel 200. The electrical potential used to energize the plurality of LEDs 268 may be sourced from the solar panels, from the battery 242, from the DC power port 260, or combinations thereof.

The DC power port 260 may be operable to provide a connection for recharging the battery 242 from an external DC power adapter. The positive side 272 of the DC power port 260 may electrically couple to the positive side 272 of the battery 242 and the negative side 274 of the DC power port 260 may electrically couple to the negative side 274 of the battery 242. As a non-limiting example, the DC power port 260 may be a coaxial power connector.

The DC power port 260 and the one or more USB charging ports 244 may be accessible on a second end 284 of the housing 276, opposite the plurality of LEDs 268 and the switch 264.

The pocket 280 may be a pouch located on the reverse side 218 of the second solar panel 202. The pocket 280 may be positioned where the pocket 280 will not mechanically interfere with the housing 276 of the controller 240 when the solar panels are folded to the book configuration 294. The pocket 280 may hold the rechargeable device while the rechargeable device is being recharged. As a non-limiting example, the pocket 280 may hold a smartphone while the smartphone is recharged from one of the one or more USB charging ports 244.

In use, the battery 242 may initially be charged using the solar panels or by using the DC power port 260 and the external DC power adapter. A rechargeable device may be electrically coupled to one of the one or more USB charging ports 244 to recharge the rechargeable device from the solar panels, the battery 242, the DC power port 260, or combinations thereof. As non-limiting examples, the rechargeable device may be the smartphone, a tablet computer, or a portable music player. The rechargeable device may be stored in the pocket 280 while recharging.

The solar panels may be unfolded to the flat configuration 290 to provide both the first solar panel 200 and the second solar panel 202 with equal exposure to the light source 900. The solar panels may be folded to the tent configuration 292 to angle the first solar panel 200 or the second solar panel 202 for better exposure to the light source 900. When not using the solar panels, the solar panels may be folded to the book configuration 294 and held in the book configuration 294 using the nylon fastener 232.

At night, the plurality of LEDs 268 may be used as a flashlight by moving the switch 264 to the ON position to energize the plurality of LEDs 268 from the battery 242 or from the DC power port 260 and the external DC power adapter. When the illumination is no longer needed, the switch 264 may be moved to the OFF position.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "couple", "couples", "coupled" or "coupling", may refer to connecting, either directly or indirectly, and does not necessarily imply a mechanical connection.

As used in this disclosure, "DC" may be an acronym for direct current.

As used herein, the terms "DC power adapter", "DC power supply", "low voltage DC power adapter", or "low voltage DC power supply" may refer to a power supply that converts an alternating current (AC) input voltage on the order of 110 VAC or 220 VAC, 50 or 60 Hz to a direct-current (DC) voltage. The words "low voltage" in the name indicate that the output DC voltage is 49 VDC or less. Low voltage DC power adapters producing outputs of 3 VDC, 6 VDC, 9 VDC, and 12 VDC are common and may be used with calculators, cell phones, laptop computers, portable loudspeakers, and other consumer electronics. Low voltage DC power adapters are commonly packaged as small rectangular boxes that either plug directly into an AC outlet and provide a pair of conductors running from the box to a DC power connector or that have an AC line cord extending from one side of the box and a DC power cord extending from the opposing side of the box.

As used in this disclosure, a "diode" may be a two terminal semiconductor device that allows current flow in only one direction. The two terminals are called the anode and the cathode. Electric current is allowed to pass from the anode to the cathode.

As used herein, "energize" and/or "energization" may refer to the application of an electrical potential to a system or subsystem.

As used in this disclosure, a "fastener" may be a device that is used to join or affix two objects. Fasteners may generally comprise a first element which is attached to the first object and a second element which is attached to the second object such that the first element and the second element join to affix the first object and the second object. Common fasteners may include, but are not limited to, hooks, zippers, snaps, clips, ties, buttons, buckles, quick release buckles, or hook and loop fasteners.

As used in this disclosure, a "housing" may be a rigid or semi-rigid casing that encloses and protects one or more devices.

As used in this disclosure, an "LED" may be an acronym for a light emitting diode. An LED allows current to flow in one direction and when current is flowing the LED emits photons. The wavelength of the light that is emitted may be in the visible range of the spectrum or may extend into either the infrared (IR) spectral range or the ultraviolet (UV) spectral range. The brightness of the LED can be increased and decreased by controlling the amount of current flowing through the LED. Multiple LEDs having different emission spectrums may be packaged into a single device to produce a multi-color LED. A broad range of colors may be produced by multi-color LEDs by selecting which of the multiple LEDs are energized and by controlling the brightness of each of the multiple LEDs. Organic LEDs (OLEDs) are included in this definition.

As used in this disclosure, "orientation" may refer to the positioning and/or angular alignment of a first object relative to a second object or relative to a reference position or reference direction.

As used in this disclosure, a "resistor" may be an electrical device that inhibits the flow of electricity through an electric circuit. Within an electric circuit processing alternating currents, the resistor will not affect the phase of the alternating current. A current flowing through a resistor will create a voltage across the terminals of the resistor.

As used herein, "smart phone" or "smartphone" may refer to a personal communication device that incorporates cellular phone calling and texting capabilities along with advanced features. Non-limiting examples of the advanced features of a smart phone may include camera functions, multimedia functions (such as music and video recording and playback and gaming), internet functions (such as web browsing and file uploading/downloading), and Global Positioning System capabilities. A smartphone may be able to execute downloaded application programs that expand the capabilities of the smartphone.

As used herein, "solar incidence angle" may refer to the angle between the sun's rays and the normal on a surface.

As used herein, the word "substantially" indicates that two or more attributes are the same except for a margin of error related to variances in materials, manufacturing processes, craftsmanship, installation, environmental conditions, or other factors that may influence the attributes and that the differences introduced by these factors are not considered detrimental to the operation of the invention as described herein.

As used in this disclosure, a "supporting surface" may be a horizontal surface upon which an object is placed. Within this disclosure, it is assumed that the object is placed on the supporting surface in an orientation that is appropriate for the normal or anticipated use of the object.

As used in this disclosure, a "switch" may be an electrical device that starts and stops the flow of electricity through an electric circuit by completing or interrupting an electric circuit. The act of completing or interrupting the electrical circuit may be called actuation. Completing or interrupting an electric circuit with a switch is often referred to as closing or opening a switch, respectively. Completing or interrupting an electric circuit is also referred to as making or breaking the circuit, respectively.

As used in this disclosure, "USB" may be an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

As used in this disclosure, "Vcc" may be an acronym for Voltage at the Common Collector. Technically, the Vcc is the primary power source for an NPN transistor. In this disclosure, the definition of Vcc is more broadly defined to mean a direct current voltage source.

Throughout this document references to "wire", "wires", "wired", or "wiring" may describe and/or show a single conductor when, in fact, two conductors may be required to power or control a subsystem; a convention used herein is that the common return conductor to which all electrical subsystems are connected may not be shown in order to clarify the figures. This common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A solar USB charger comprising:
a first solar panel, a second solar panel, a spine, a controller, and a pocket;
wherein the first solar panel and the second solar panel are adapted to convert incident light from a light source into an electrical potential;
wherein the electrical potential from the first solar panel and the second solar panel is electrically coupled to the controller where the electrical potential is operable to recharge a battery, to power one or more USB charging ports, to illuminate a plurality of LEDs, or combinations thereof;
wherein the first solar panel and the second solar panel are hingedly coupled via the spine;
wherein the plurality of LEDs are operable to provide illumination;
wherein the controller comprises the battery, the one or more USB charging ports, a blocking diode, the plurality of LEDs, a switch, and a dropping resistor;
wherein the controller electrically couples the solar panels, the battery, the one or more USB charging ports, the blocking diode, the switch, the dropping resistor, and the plurality of LEDs via a circuit board enclosed in a housing;
wherein the controller is coupled to the reverse side of the first solar panel.

2. The solar USB charger according to claim 1
wherein an individual solar panel selected from the first solar panel and the second solar panel comprises one or more solar cells coupled to one side of a backing panel;
wherein the side of the backing panel where the one or more solar cells are coupled defines an obverse side of the individual solar panel;
wherein the side of the backing panel that is opposite the obverse side defines a reverse side of the individual solar panel.

3. The solar USB charger according to claim 2
wherein the first solar panel and the second solar panel are collectively referred to as solar panels;
wherein the solar panels are operable to unfold to a flat configuration where both of the solar panels have equal exposure to the light source.

4. The solar USB charger according to claim 3
wherein the solar panels are operable to fold to a tent configuration where the solar panels are angled with respect to the supporting surface such that a solar incidence angle between the light source and one of the solar panels is minimized.

5. The solar USB charger according to claim 4
wherein the solar panels are operable to fold to a book configuration such that the first solar panel and the second solar panel are substantially parallel to each other and are located inside of the book configuration such that the solar panels are not exposed;
wherein the book configuration reduces the likelihood of physical damage to the solar panels;
wherein the spine defines a separation distance between the solar panels such that when the solar panels are folded to the book configuration the separation distance provides clearance between the solar panels for the controller and the pocket.

6. The solar USB charger according to claim 5
wherein an individual solar cell selected from the one or more solar cells is a photovoltaic solar cell that develops the electrical potential between surfaces of the individual solar cell when exposed to the light source.

7. The solar USB charger according to claim 6
wherein the solar panels are electrically coupled in parallel with each other and with the controller via wiring that runs through the backing panels and through the spine.

8. The solar USB charger according to claim 7
wherein a nylon fastener retains the first solar panel to the second solar panel in the book configuration;
wherein the nylon fastener comprises a first fastener segment and a second fastener segment;
wherein the first fastener segment is coupled to the edge of the first solar panel that is opposite the spine;
wherein the second fastener segment is coupled to the edge of the second solar panel that is opposite the spine;
wherein the first fastener segment detachably couples to the second fastener segment to hold the first solar panel in an orientation that is substantially parallel to the second solar panel when the solar panels are folded to the book configuration.

9. The solar USB charger according to claim 8
wherein the spine comprises a loop that is operable for hanging the solar USB charger.

10. The solar USB charger according to claim 8
wherein the battery comprises one or more energy-storage devices;
wherein the battery is a source of electrical energy to operate the one or more USB charging ports and/or the plurality of LEDs;
wherein the battery is rechargeable and replaceable;
wherein the battery is accessed for removal and replacement via a battery door on the housing.

11. The solar USB charger according to claim 10
wherein the one or more USB charging ports are USB connectors where rechargeable devices are detachably coupled via USB cables such that the rechargeable devices are recharged;
wherein the electrical potential used to recharge the rechargeable devices via the one or more USB charging ports is sourced from the solar panels, from the battery, from a DC power port, or combinations thereof.

12. The solar USB charger according to claim 11
wherein an individual USB charging port selected from the one or more USB charging ports is a USB connector with a VCC pin electrically coupled to a positive side of the battery and a GROUND pin electrically coupled to a negative side of the battery.

13. The solar USB charger according to claim 12
wherein the individual USB charging port has a D+ pin electrically coupled to a D− pin via a shorting resistor to signal to the rechargeable device that the rechargeable device is coupled to a charger.

14. The solar USB charger according to claim 13
wherein the positive side of the solar panels is coupled to the positive side of the battery via the blocking diode to permit charging of the battery from the solar panels and to prevent the battery from discharging through the solar panels.

15. The solar USB charger according to claim 14
wherein the plurality of LEDs illuminate when energized;
wherein the plurality of LEDs are energized by moving the switch to an ON position and are de-energized by moving the switch to an OFF position;
wherein the dropping resistor reduces the current flow through the plurality of LEDs;
wherein the plurality of LEDs and the switch are positioned on a first end of the controller such that the plurality of LEDs are adjacent an edge of the first solar panel;
wherein the electrical potential used to energize the plurality of LEDs is sourced from the solar panels, from the battery, from the DC power port, or combinations thereof.

16. The solar USB charger according to claim 15
wherein the DC power port is operable to provide a connection for recharging the battery from an external DC power adapter;
wherein the positive side of the DC power port electrically couples to the positive side of the battery and the negative side of the DC power port electrically coupled to the negative side of the battery.

17. The solar USB charger according to claim 16
wherein the DC power port and the one or more USB charging ports are accessible on a second end of the housing, opposite the plurality of LEDs and the switch.

18. The solar USB charger according to claim 17
wherein the pocket is a pouch located on the reverse side of the second solar panel;
wherein the pocket is positioned where the pocket will not mechanically interfere with the housing of the controller when the solar panels are folded to the book configuration;
wherein the pocket is operable to hold the rechargeable device while the rechargeable device is being recharged.

* * * * *